(12) United States Patent
Kawada et al.

(10) Patent No.: US 11,497,080 B2
(45) Date of Patent: Nov. 8, 2022

(54) WIRELESS COMMUNICATION APPARATUS AND WIRELESS COMMUNICATION METHOD

(71) Applicant: SEIKO EPSON CORPORATION, Tokyo (JP)

(72) Inventors: Yuta Kawada, Shiojiri (JP); Yutaka Tsurumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 39 days.

(21) Appl. No.: 17/229,030

(22) Filed: Apr. 13, 2021

(65) Prior Publication Data

US 2021/0329734 A1   Oct. 21, 2021

(30) Foreign Application Priority Data

Apr. 16, 2020   (JP) .............................. JP2020-073345

(51) Int. Cl.
*H04W 76/34* (2018.01)
*H04W 72/08* (2009.01)
*H04W 72/04* (2009.01)

(52) U.S. Cl.
CPC ....... *H04W 76/34* (2018.02); *H04W 72/0453* (2013.01); *H04W 72/082* (2013.01)

(58) Field of Classification Search
CPC ..... H04W 76/10–19; H04W 76/30–38; H04W 72/04; H04W 72/0453; H04W 72/08–087; H04W 40/02; H04W 40/16; H04W 40/22; H04W 40/24–248; H04W 88/04
See application file for complete search history.

(56) References Cited

U.S. PATENT DOCUMENTS

| 2013/0171986 | A1* | 7/2013 | Shimizu | H04W 76/19 455/423 |
| 2014/0086141 | A1* | 3/2014 | Morioka | H04W 40/08 370/315 |
| 2017/0105242 | A1  | 4/2017 | Nakagawa | |
| 2018/0027412 | A1* | 1/2018 | Mandapaka | A61B 5/14503 713/151 |
| 2020/0288326 | A1* | 9/2020 | Borges | H04W 16/14 |
| 2020/0383172 | A1* | 12/2020 | McCracken | H04W 88/06 |

FOREIGN PATENT DOCUMENTS

JP   2017-073675 A   4/2017

* cited by examiner

*Primary Examiner* — Chi H Pham
*Assistant Examiner* — Vladislav Y Agureyev
(74) *Attorney, Agent, or Firm* — Workman Nydegger (57) ABSTRACT

A wireless communication apparatus performs communication with a relay apparatus that performs change processing for changing a channel for wireless connection upon detecting an interference condition. The wireless communication apparatus includes a wireless communication unit and a communication control unit. The wireless communication unit establishes the wireless connection with the relay apparatus. The communication control unit performs control for disconnecting the wireless connection, when the communication with the relay apparatus through the wireless connection stops for a period based on a set timeout time. The communication control unit increases the period before the control for disconnecting the wireless connection is performed, when the wireless connection is performed through a target channel on which the change processing is performed.

7 Claims, 10 Drawing Sheets

| | PORT NO. | TIMEOUT TIME To (SECOND) | |
|---|---|---|---|
| PO1 → | 515 | T1=30 | (PRINTING) |
| PO1 → | 9100 | T1=30 | (PRINTING, OBTAINING OF PRINTER INFORMATION, AND SETTING) |
| PO2 → | 80 | T1=30 | (OBTAINING OF PRINTER INFORMATION AND SETTING) |
| PO2 → | 443 | T1=30 | (OBTAINING OF PRINTER INFORMATION AND SETTING) |
| | ... | ... | |

| PORT NO. | TIMEOUT TIME To (SECOND) | |
|---|---|---|
| PO1 → 515 | T2=90 | (PRINTING) |
| PO1 → 9100 | T2=90 | (PRINTING, OBTAINING OF PRINTER INFORMATION, AND SETTING) |
| PO2 → 80 | T1=30 | (OBTAINING OF PRINTER INFORMATION AND SETTING) |
| PO2 → 443 | T1=30 | (OBTAINING OF PRINTER INFORMATION AND SETTING) |
| ... | ... | |

WIRELESS COMMUNICATION APPARATUS AND WIRELESS COMMUNICATION METHOD

The present application is based on, and claims priority from JP Application Serial Number 2020-073345, filed Apr. 16, 2020, the disclosure of which is hereby incorporated by reference herein in its entirety.

BACKGROUND

1. Technical Field

The present disclosure relates to a wireless communication apparatus and a wireless communication method that perform communication with a relay apparatus.

2. Related Art

Printers that receive print instructions from host apparatuses via access points have been used as wireless communication apparatuses. In order to receive print instructions from a plurality of host apparatuses, each printer is adapted to perform processing for disconnecting wireless connection with one host apparatus when a predetermined timeout time passes after a link with an access point is disconnected, to thereby able to receive a print instruction from another host apparatus.

Also, some models of the printers in recent years support 5 GHz band wireless communication. The 5 GHz band wireless communication complies with IEEE 802.11h. IEEE is an abbreviation for Institute of Electrical and Electronics Engineers. The wireless LAN standard defined in IEEE 802.11h mandates DFS in which upon detection of a radar radio wave having a specific frequency used by a weather radar or the like, channel switching is performed so as to use a channel having a frequency other than the specific frequency. LAN is an abbreviation for local area network, and DFS is an abbreviation for Dynamic Frequency Selection. The reason why DFS is mandated is to avoid adverse effects on C-band radars mainly used for meteorological observation. In the 5 GHz band, the W53 and W56 channel bands are DFS-enabled. For using a channel included in the W53 and W56 channel bands, an access point that performs 5 GHz band wireless communication monitors radio waves having frequencies used by radars and so on and must stop using, during processing for detecting the radar radio waves having the specific frequencies, a channel having a specific frequency band for wireless communication.

JP-A-2017-73675 discloses a system in which when at least one of a wireless communication apparatus, which is parent equipment, and an opposing apparatus, which is child equipment, detects a radar radio wave of a weather radar or the like, the equipment that detected the radar radio wave transmits a keepalive request to the other equipment to thereby perform keepalive processing between the parent equipment and the child equipment.

There is also a wireless communication apparatus that can set a timeout time and that has a function for automatically disconnecting a connection for wireless communication with a relay apparatus, which is parent equipment, when the wireless communication is not performed for the timeout time. During wireless connection with the relay apparatus, when the relay apparatus performs detection processing for detecting radio waves having a specific frequency for a certain period of time by using a DFS function, there are cases in which the period of time in which the wireless communication apparatus cannot communicate with the relay apparatus exceeds the timeout time, and the wireless connection with the relay apparatus is disconnected. Such a problem also lies in wireless communication apparatuses, such as scanners and projectors, other than printers.

SUMMARY

According to an aspect of the present disclosure, there is provided a wireless communication apparatus that performs communication with a relay apparatus that performs change processing for changing a channel for wireless connection upon detecting an interference condition. The wireless communication apparatus includes: a wireless communication unit that establishes the wireless connection with the relay apparatus; and a communication control unit that performs control for disconnecting the wireless connection, when the communication with the relay apparatus through the wireless connection stops for a period based on a set timeout time. The communication control unit increases the period before the control for disconnecting the wireless connection is performed, when the wireless connection is performed through a target channel on which the change processing is performed.

According to an aspect of the present disclosure, there is provided a wireless communication method that performs communication with a relay apparatus that performs change processing for changing a channel for wireless connection upon detecting an interference condition. The wireless communication method includes: a wireless communication step of establishing the wireless connection with the relay apparatus; and a communication control step of performing control for disconnecting the wireless connection, when the communication with the relay apparatus through the wireless connection stops for a period based on a set timeout time. In the communication control step, the period before the control for disconnecting the wireless connection is performed is increased when the wireless connection is performed through a target channel on which the change processing is performed.

DESCRIPTION OF EXEMPLARY EMBODIMENTS

An embodiment of the present disclosure will be described below. Naturally, the embodiment described below is merely exemplary in the present disclosure, and not all of the features described in the embodiment are essential in the present disclosure.

1. Overview of Technology Included in the Present Disclosure

First, an overview of the technology included in the present disclosure will be described with reference to examples illustrated in FIGS. 1 to 10. The drawings in the present disclosure schematically illustrate examples, enlargement ratios in respective directions illustrated in the drawings may be different from one another, and the drawings do not necessarily match each other. Naturally, the elements in the present technology are not limited to specific examples denoted by reference numerals. In "Overview of Technology Included in the Present Disclosure", the contents in parentheses respectively mean supplementary descriptions of the words or expressions immediately preceding thereto.

First Aspect

Figure 1:
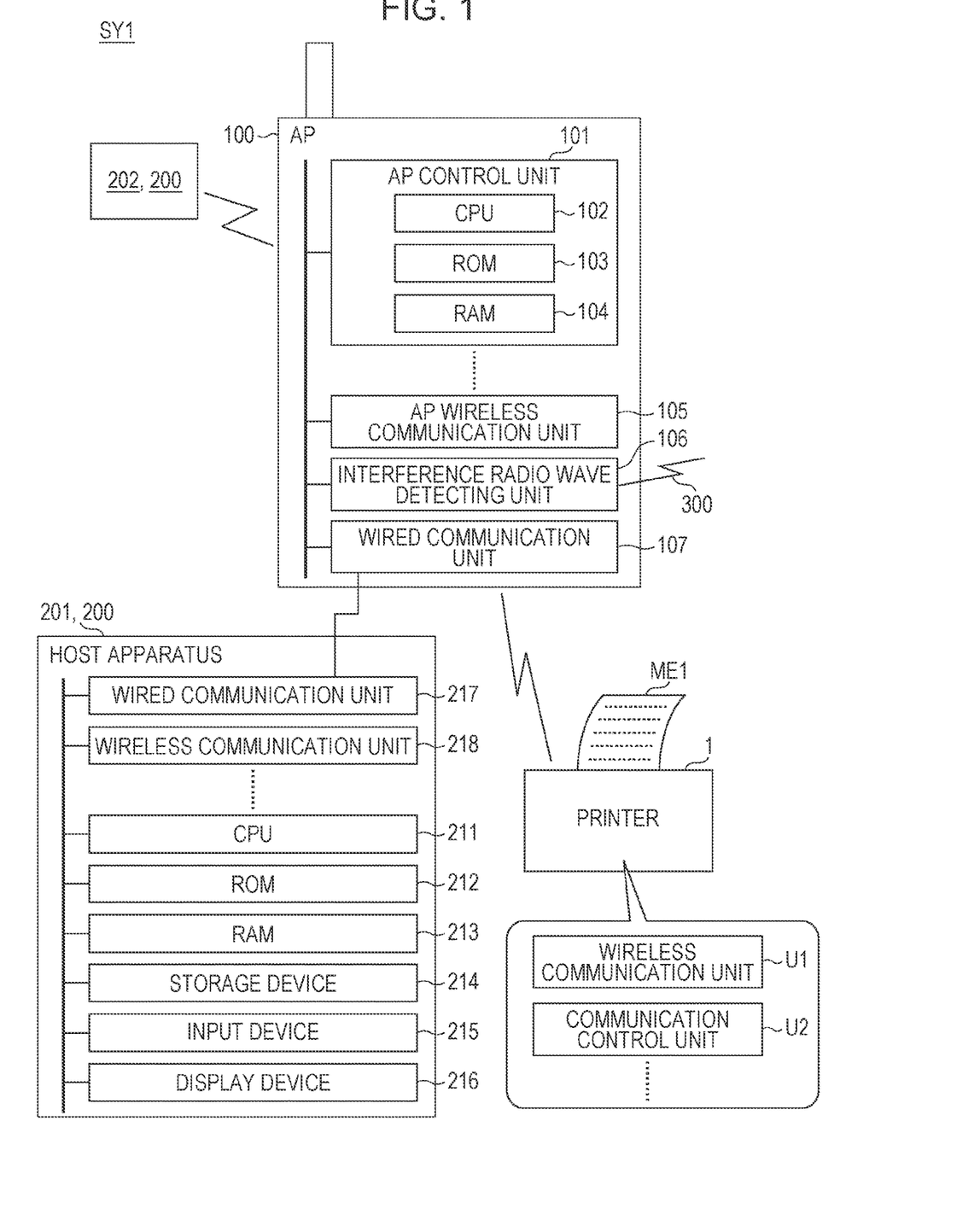
FIG. 1 is a diagram schematically illustrating an example of a wireless communication system including a wireless communication apparatus.
Figure 2:
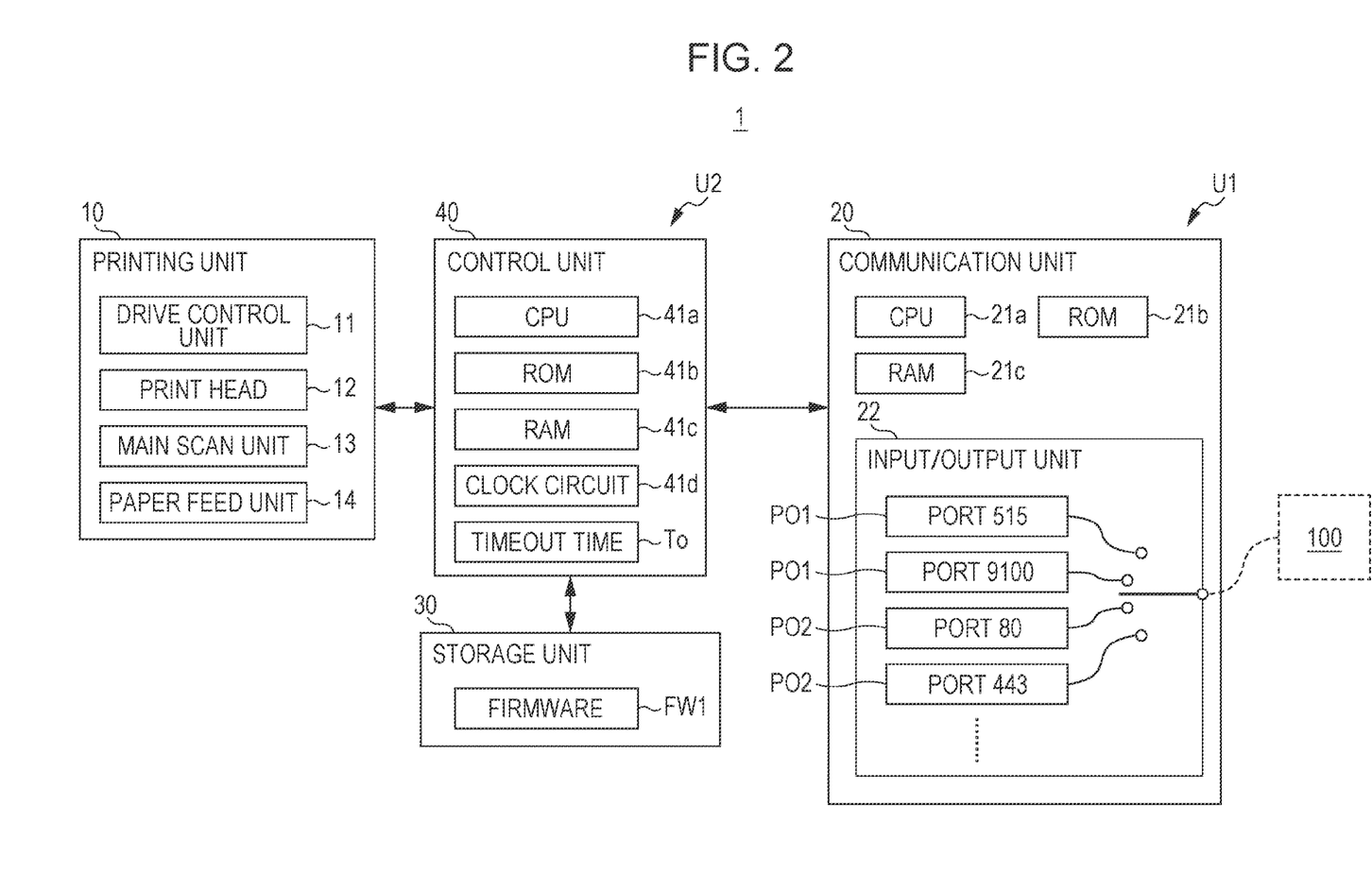
FIG. 2 is a block diagram schematically illustrating a configuration example of the wireless communication apparatus.

As illustrated in FIGS. 1 and 2, a wireless communication apparatus (e.g., a printer 1) according to one aspect of the present technology is a wireless communication apparatus (1) that performs communication with a relay apparatus (e.g., an access point 100) that performs change processing for changing a channel 400 for wireless connection upon detecting an interference condition (e.g., an interference radio wave 300). The wireless communication apparatus (1) includes a wireless communication unit U1 and a communication control unit U2. The wireless communication unit U1 establishes the wireless connection with the relay apparatus (100). When the communication with the relay apparatus (100) through the wireless connection stops for a period based on a set timeout time To, the communication control unit U2 performs control for disconnecting the wireless connection. When the wireless connection is performed through a target channel 410 on which the change processing is to be performed, the communication control unit U2 increases the period before the control for disconnecting the wireless connection is performed.

Thus, when the wireless connection is performed through the target channel 410 on which the change processing is to be performed, a period before the wireless connection is disconnected increases. Accordingly, the above-described aspect can provide a wireless communication apparatus that reduces the possibility that wireless connection is disconnected when the relay apparatus changes a channel.

In this case, examples of the wireless communication apparatus include an image processing apparatus that processes images and a portable terminal. Examples of the image processing apparatus includes an image forming apparatus that forms images and an image reading apparatus that reads images. Examples of the image forming apparatus include a printing apparatus such as an ink jet printer or an electrophotographic printer, a copier, a facsimile apparatus, multifunctional equipment having at least one of functions included in these apparatuses, and a display device. Examples of the image reading apparatus include a scanner, a facsimile apparatus, multifunctional equipment having at least one of functions included in these apparatuses, and an imaging apparatus. The above remarks are also applied to the aspects below.

Second Aspect

Figure 5:
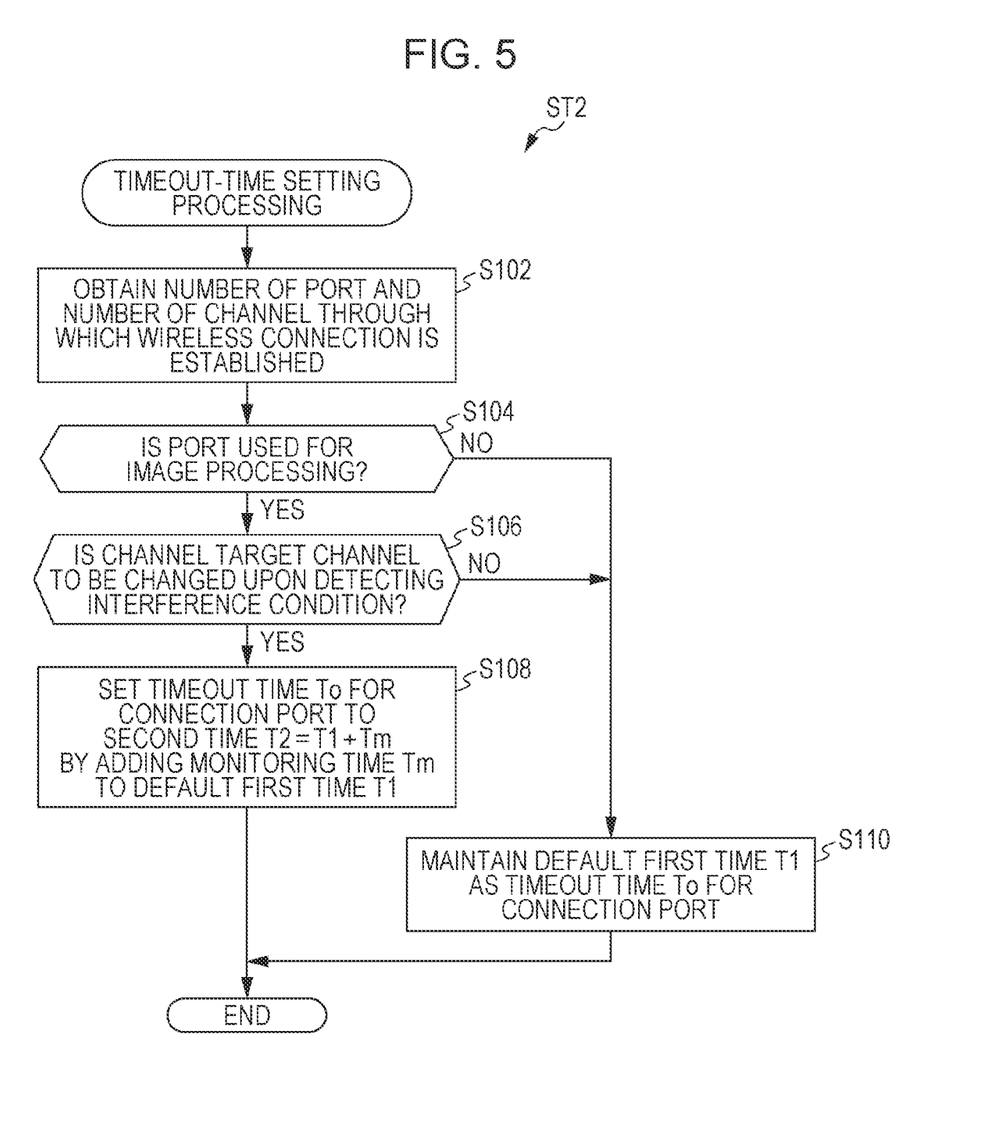
FIG. 5 is a flowchart schematically illustrating an example of timeout-time setting processing.

As illustrated in FIG. 1, the aforementioned interference condition may be that the wireless connection is performed through the target channel 410 having a specific frequency for Dynamic Frequency Selection (DFS). As illustrated in FIG. 5 and so on, when the wireless connection is performed through the target channel 410, the communication control unit U2 may make the period before the control for disconnecting the wireless connection is performed longer than a monitoring time Tm taken for the relay apparatus (100) to monitor the interference radio wave 300. This aspect can provide a wireless communication apparatus that reduces the possibility that the wireless connection is disconnected due to channel changing performed when the relay apparatus detects an interference radio wave. Although not included in the second aspect described above, for example, a case in which congestion of a radio wave of the target channel is the interference condition is also included in the present technology.

Third Aspect

Figure 3:
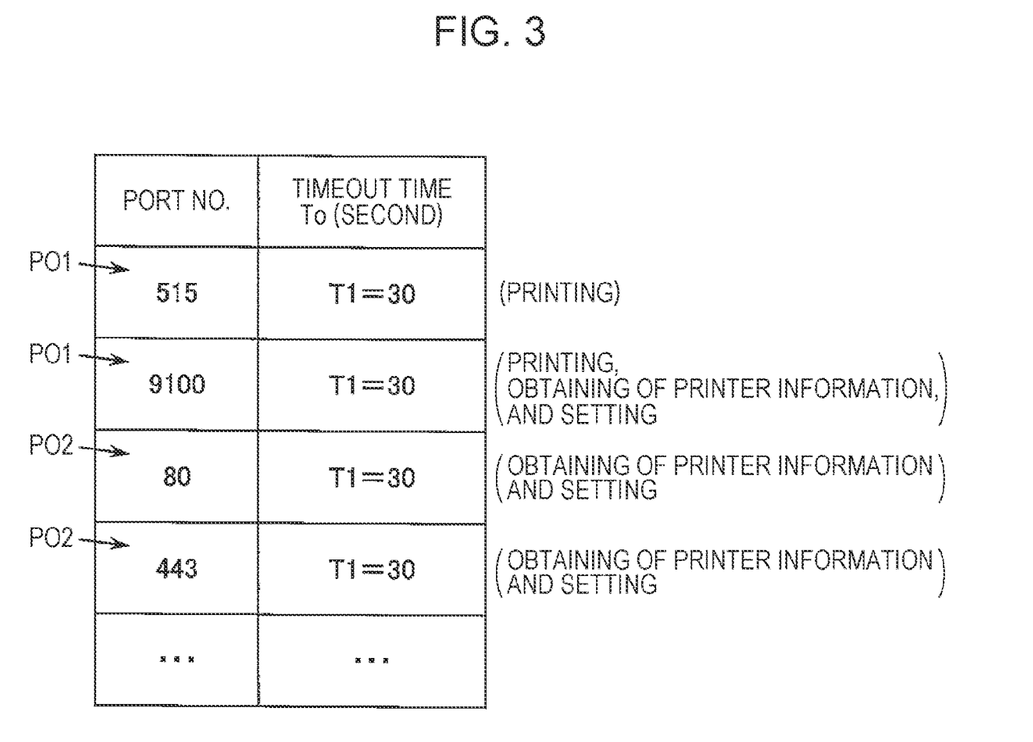
FIG. 3 is a table schematically illustrating an example of initial timeout times.

As illustrated in FIG. 3, the timeout time To may be set to a first time T1. As illustrated in FIG. 5 and so on, when the wireless connection is performed through the target channel 410, the communication control unit U2 may change the timeout time To to a second time T2 that is longer than the first time T1. This aspect can provide a preferable example in which the possibility that the wireless connection is disconnected when the relay apparatus changes a channel is reduced. In this case, "first", "second", . . . in the present disclosure are terms for identifying corresponding constituent elements included in a plurality of constituent elements having mutually similar points and do not represent an order. Which of the plurality of constituent elements correspond to the "first", "second", . . . is determined according to a relative relationship. This remark is also applied to the aspects below.

Fourth Aspect

Also, when the wireless connection is performed through the target channel 410, the communication control unit U2 may determine the second time T2 by adding a predetermined time (e.g. the monitoring time Tm) taken for DFS processing to the first time T1. This aspect can provide a more preferable example in which the possibility that wireless connection is disconnected when the relay apparatus changes a channel is reduced.

Fifth Aspect

As illustrated in FIG. 2, the wireless communication unit U1 may also include first ports PO1 used for image processing and second ports PO2 not used for the image processing. When one of the first port PO1 is used, and the wireless connection is performed through the target channel 410, the communication control unit U2 may increase the period before the control for disconnecting the wireless connection is performed, and when one of the second ports PO2 is used, the communication control unit U2 may maintain the period based on the timeout time To. This aspect can provide a preferable example in which the possibility that wireless connection is disconnected when the relay apparatus changes a channel is reduced. The image processing in this case includes image formation, such as printing, copying, and displaying, and image reading, such as scanning and imaging. This remark is also applied to the aspects below.

Sixth Aspect

Figure 9:
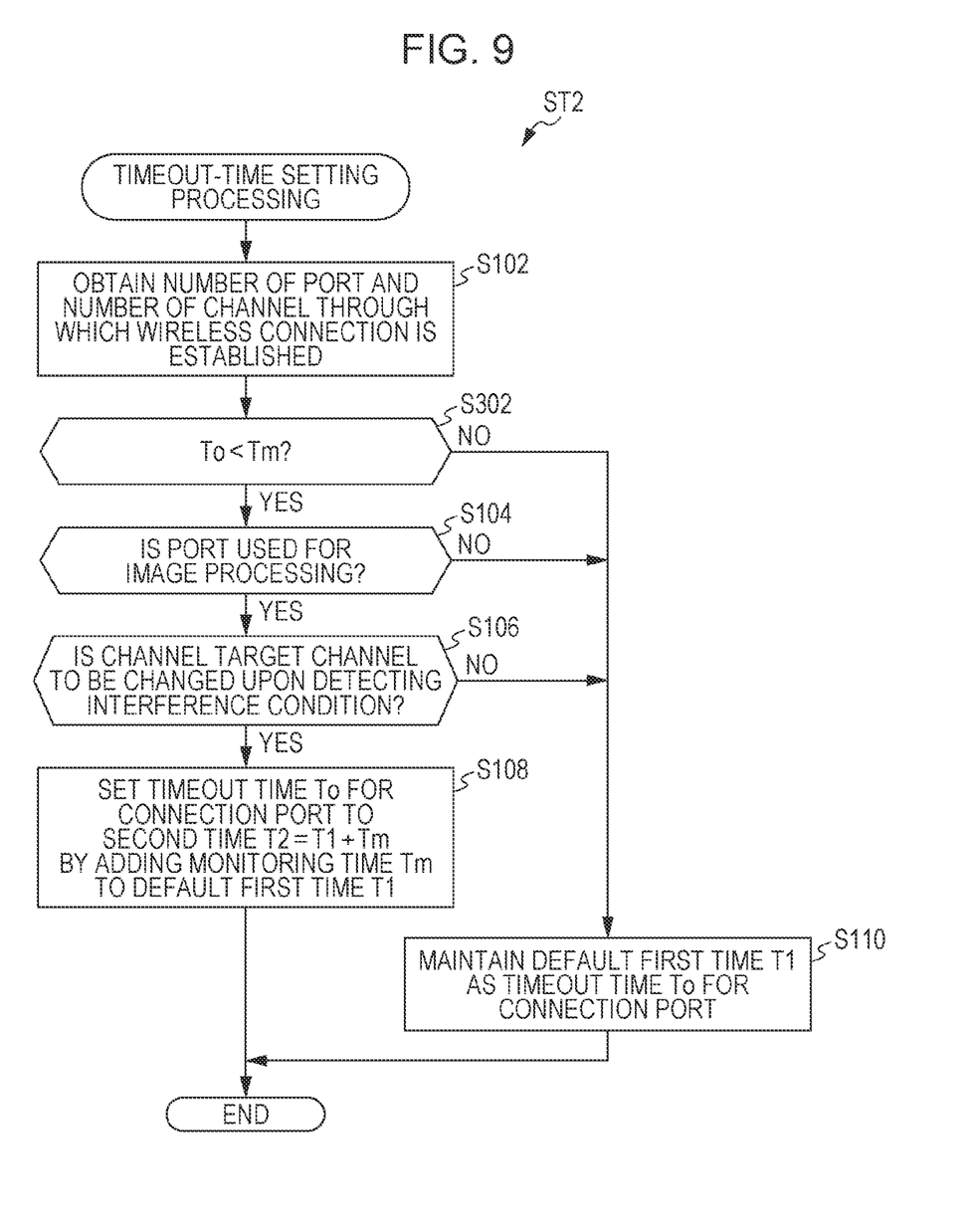
FIG. 9 is a flowchart schematically illustrating a modification of the timeout-time setting processing.

As illustrated in FIG. 9 and so on, when the set timeout time To is shorter than a predetermined time (e.g., the monitoring time Tm), and the wireless connection is performed through the target channel 410, the communication control unit U2 may increase the period before the control for disconnecting the wireless connection is performed, and when the set timeout time To is longer than or equal to the predetermined time (Tm), the communication control unit U2 may maintain the period based on the timeout time To. This aspect makes it possible to reduce the possibility that wireless connection is disconnected when the relay apparatus changes a channel, while suppressing occurrence of an event in which the wireless connection is not disconnected for a long time when the set timeout time To is long.

Seventh Aspect

Figure 7:
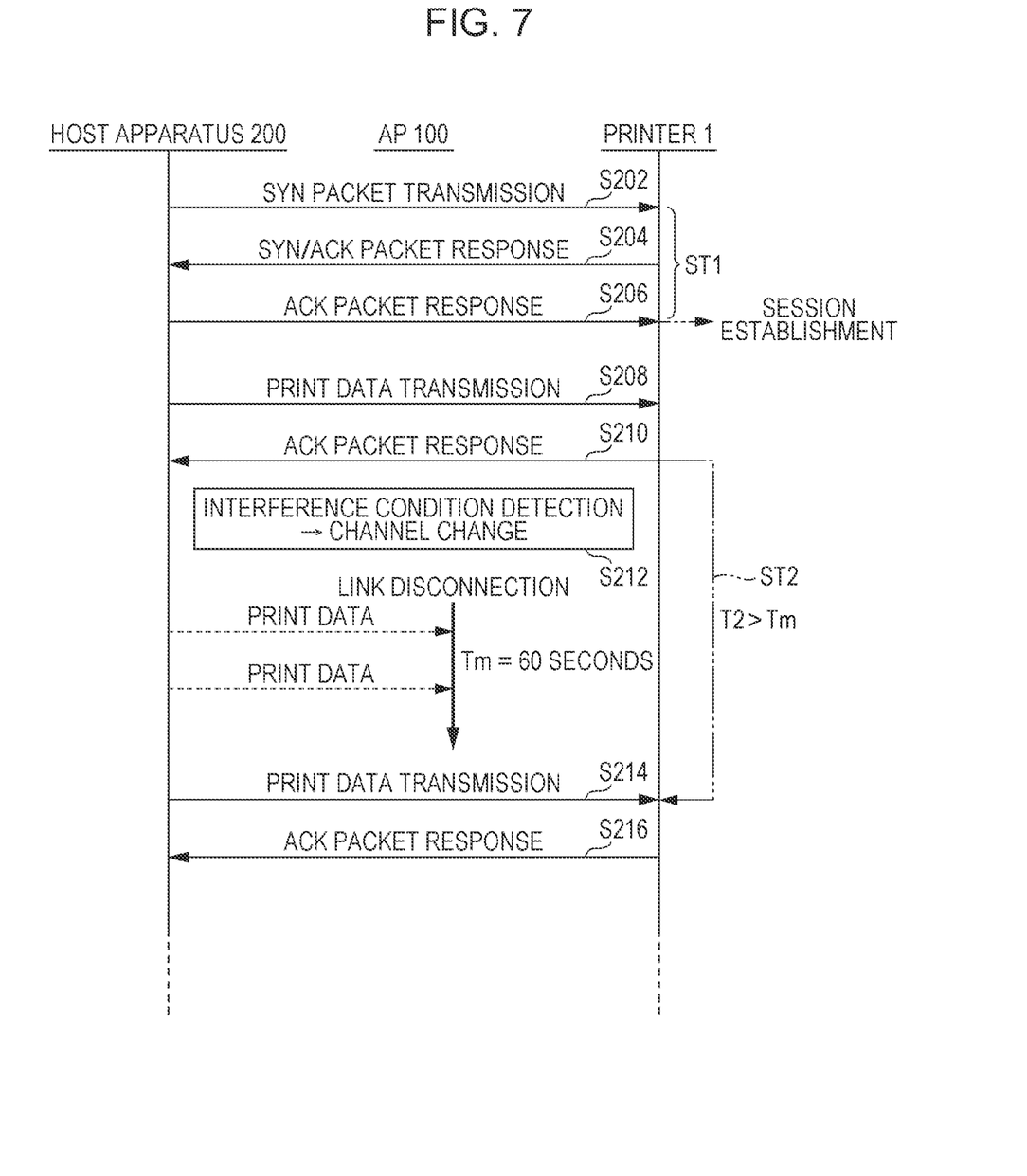
FIG. 7 is a diagram schematically illustrating an example of a sequence in the wireless communication system.

Meanwhile, as illustrated in FIGS. 5, 7, and so on, a wireless communication method according to one aspect of the present technology is a wireless communication method that performs communication with the relay apparatus (100) that performs change processing for changing the channel 400 for wireless connection upon detecting the interference condition (300). The wireless communication method includes a wireless communication process ST1 and a communication control process ST2. In the wireless communication process ST1 in the wireless communication method, the wireless connection with the relay apparatus (100) is established. In the communication control process ST2 in the wireless communication method, when the communication with the relay apparatus (100) through the wireless connection stops for a period based on the set timeout time To, control for disconnecting the wireless connection is performed. In addition, in the communication control process ST2 in the wireless communication method, when the wireless connection is performed through the target channel 410 on which the change processing is to be performed, the period before the control for disconnecting the wireless connection is performed is increased. This aspect can provide a wireless communication method that reduces the possibility that wireless connection is disconnected when the relay apparatus changes a channel.

In addition, the present technology is applicable to a wireless communication system including the above-described wireless communication apparatus, a wireless communication method for the above-described wireless communication system, a control program for the wireless communication apparatus, a control program for the wireless communication system, a computer-readable medium in which one of the control programs is recorded, and so on. The above-described wireless communication apparatus may be constituted by distributed portions.

2. Specific Example of Wireless Communication System Including Wireless Communication Apparatus FIG. 1 schematically illustrates a wireless communication system SY1 including the printer 1, which is an example of the wireless communication apparatus in the present technology. The wireless communication system SY1 illustrated in FIG. 1 includes the access point 100, the printer 1, and a plurality of host apparatuses 200. The host apparatuses 200 include a host apparatus 201 that is connected to the access point 100 through a cable and a host apparatus 202 that is wirelessly connected to the access point 100. In FIG. 1, the configurations of the host apparatuses 201 and 202 are collectively illustrated in the block of the host apparatus 201. "AP" illustrated in FIGS. 1, 7, 8, and 10 is an abbreviation for access point.

A wireless network in which the printer 1 and the host apparatuses 200 are wirelessly connected to each other via the access point 100 allows for, for example, 5 GHz band wireless communication that complies with IEEE 802.11h. The printer 1 may support the 5 GHz band wireless communication, and the host apparatus 200 may also support the 5 GHz band wireless communication. As described above, in order to avoid adverse effects on C-band radars used mainly for meteorological observation, the wireless LAN standard defined in IEEE 802.11h mandates DFS for changing a wireless LAN channel upon detection of a radar radio wave. The printer 1 illustrated in FIG. 1 includes the wireless communication unit U1 and the communication control unit U2, and performs printing on a print substrate ME1, based on print data from the host apparatus 200. The print substrate is a material for retaining a print image. Continuous paper such as a roll of paper, a rectangular sheet of paper, a generally circular shape medium such as an optical disk, a three-dimensional-shape medium, or the like can be used for the print substrate. The material of the print substrate is not limited to paper including thermal paper and may be a resin, metal, or the like. The printer 1 may be installed at a facility, as with a large-size printer, or may be a mobile printing apparatus.

The access point 100 illustrated in FIG. 1 includes an AP control unit 101, an AP wireless communication unit 105, an interference radio wave detecting unit 106, and a wired communication unit 107. Information can be input to and output from the elements 101 and 105 to 107 through electrical connection therebetween. The AP control unit 101 includes a CPU 102, which is a processor, a ROM 103, which is a semiconductor memory, and a RAM 104, which is a semiconductor memory. CPU is an abbreviation for central processing unit, ROM is an abbreviation for read-only memory, and RAM is an abbreviation for random-access memory. The CPU 102 performs various types of processing by executing a program stored in the ROM 103 while using the RAM 104 as a work area.

Although not illustrated, the access point 100 has a MAC address, which is an identification number physically assigned for uniquely identifying the access point 100, an SSID, which is an identifier of the access point 100, a password that is used in combination with the SSID, and so on. The MAC address is an abbreviation for media access control address, and SSID is an abbreviation for service set identifier. By using the MAC address, the SSID, and the password for establishing wireless connection with wireless equipment, such as the printer 1 or the host apparatus 202, the AP wireless communication unit 105 performs wireless communication with the wireless equipment in accordance with a predetermined standard. The AP wireless communication unit 105 and the wireless equipment not only perform wireless communication using a DFS-enabled channel but may also perform wireless communication using a channel included in the W52 channel band, a channel included in the 2.4 GHz band, or the like.

With respect to a channel that is used, the interference radio wave detecting unit 106 performs processing for monitoring the interference radio wave 300 transmitted by a radar, such as weather radar or a military radar. Upon detecting the interference radio wave 300 transmitted by a radar, the interference radio wave detecting unit 106 stops using the channel that is used and performs monitoring for a predetermined monitoring time Tm to check whether the interference radio wave 300 is detected during switching to another channel to be monitored for the interference radio wave 300. The monitoring time Tm is set to 60 seconds.

The wired communication unit 107 performs wired communication with wired equipment, such as the host apparatus 201, in accordance with a predetermined standard.

Each host apparatus 200 illustrated in FIG. 1 includes a CPU 211, which is a processor, a ROM 212, which is a semiconductor memory, a RAM 213, which is a semiconductor memory, a storage device 214, an input device 215, a display device 216, a wired communication unit 217, and a wireless communication unit 218. Information can be input to and output from the elements 211 to 218 through electrical connection therebetween. The CPU 211 performs various types of processing by executing a program stored in the ROM 212 while using the RAM 213 as a work area. The storage device 214 stores therein an OS, a control program for the printer 1, and so on. OS is an abbreviation for "operating system". The input device 215 can be implemented by a pointing device, a hardware key including a keyboard, a touch panel attached to a surface of a display panel, or the like. The display device 216 can be implemented by a liquid-crystal display panel or the like. The wired communication unit 217 performs wired communication with the access point 100 in accordance with a predetermined standard. The wireless communication unit 218 performs wireless communication with the access point 100 in accordance with the above-described wireless LAN standard. The host apparatus 200 can be implemented by a personal computer, a portable terminal such as a smartphone or a tablet terminal, a camera, or the like.

FIG. 2 schematically illustrates the configuration of the printer 1. The printer 1 includes a printing unit 10, a communication unit 20, which is an example of the wireless communication unit U1, a storage unit 30, and a control unit 40, which is an example of the communication control unit U2. FIG. 3 schematically illustrates initial timeout times To.

The printing unit 10 illustrated in FIG. 2 has a drive control unit 11, a print head 12, a main scan unit 13, and a paper feed unit 14 and performs printing on the print substrate ME1 illustrated in FIG. 1. The print head 12 performs printing on the print substrate ME1. The print head 12 can be implemented by an ink jet head, a thermal head, or the like. The main scan unit 13 has a motor for main scanning and moves the print head 12 in two opposing directions that are orthogonal to a feed direction of the print substrate ME1. The paper feed unit 14 has a motor for feeding paper and moves the print substrate ME1 in the feed direction. In accordance with an instruction from the control unit 40, the drive control unit 11 controls printing operation performed by the print head 12, operation of the main scan unit 13, and operation of the paper feed unit 14.

The communication unit 20 illustrated in FIG. 2 has a CPU 21a, which is a processor, a ROM 21b, which is a semiconductor memory, a RAM 21c, which is a semiconductor memory, an input/output unit 22 that can perform wireless communication with the AP wireless communication unit 105 in the access point 100, and so on. The communication unit 20 establishes wireless connection with the access point 100 in accordance with a predetermined protocol. The CPU 21a performs various types of processing by executing a program stored in the ROM 21b while using the RAM 21c as a work area. The input/output unit 22 has port numbers corresponding to the respective ports. The input/output unit 22 determines a port number to be used among the port numbers upon receiving a wireless connection request from the access point 100 and issues a notification indicating the determined port number to the control unit 40. The port number is a number for designating a process to be performed by the control unit 40.

Port 515 is used for printing according to LPR. LPR is an abbreviation for Line Printer Daemon Protocol. Port 9100 is used for printing and for obtaining and setting printer information. The printer information indicates settings that the printing unit 10 follow during printing. The printer information includes, for example, the type of print substrate ME1, such as whether the print substrate ME1 is a roll of paper or a sheet of paper, the size of the print substrate ME1, such as whether the size of the print substrate ME1 is size A4 or size B5, and a printing mode, such as whether the printing is color printing or black-and-white printing. Obtaining the printer information means that an external apparatus that transmits print data to the printer 1 obtains printer information in the printer 1. Setting the printer information means that an external apparatus that transmits print data to the printer 1 sets printer information in the printer 1. Ports 515 and 9100 are examples of the first ports PO1 used for image processing. Port 80 is used for obtaining and setting the printer information in accordance with HTTP and is not used for printing. HTTP is an abbreviation for HyperText Transfer Protocol. Port 443 is used for obtaining and setting the printer information in accordance with HTTPS and is not used for printing. HTTPS is an abbreviation for Hypertext Transfer Protocol over Transport Layer Security. Ports 80 and 443 are examples of the second ports PO2 not used for image processing.

The storage unit 30 illustrated in FIG. 2 stores firmware FW1 and so on therein. The firmware FW1 includes a program for controlling the operation of the printing unit 10, a program for performing inputting/outputting data to/from the communication unit 20, a program for performing timeout-time setting processing illustrated in FIG. 5, and so on.

The control unit 40 illustrated in FIG. 2 has a CPU 41a, which is a processor, a ROM 41b, which is a semiconductor memory, a RAM 41c, which is a semiconductor memory, a clock circuit 41d, and so on. The control unit 40 also holds the timeout times To set for the respective ports, as illustrated in FIG. 3. The timeout times To may be stored in the RAM 41c or may be stored in the storage unit 30. In addition to control processing on printing performed by the printing unit 10, the control unit 40 performs control for disconnecting wireless connection when communication with the access point 100 through the wireless connection stops for a period based on the set timeout time To. The CPU 41a performs various types of processing by executing a program, stored in the ROM 41b, and the firmware FW1 while using the RAM 41c as a work area. The clock circuit 41d can measure the current time and output the current time.

For example, when the host apparatus 200 wirelessly transmits a print instruction to the printer 1 via the access point 100, the communication unit 20 selects port 515 or 9100 for wireless communication and issues a notification indicating the selected port number to the control unit 40. The control unit 40 receives the notification indicating the selected port number from the communication unit 20 and causes the printing unit 10 to execute printing based on print data included in the print instruction.

As illustrated in FIG. 3, the initial timeout times To for the respective port numbers are set to the first times T1. Although all the first times T1 illustrated in FIG. 3 are 30 seconds, the first times T1 are not limited to 30 seconds and may be a period of time that differs depending on the port number.

Figure 4:
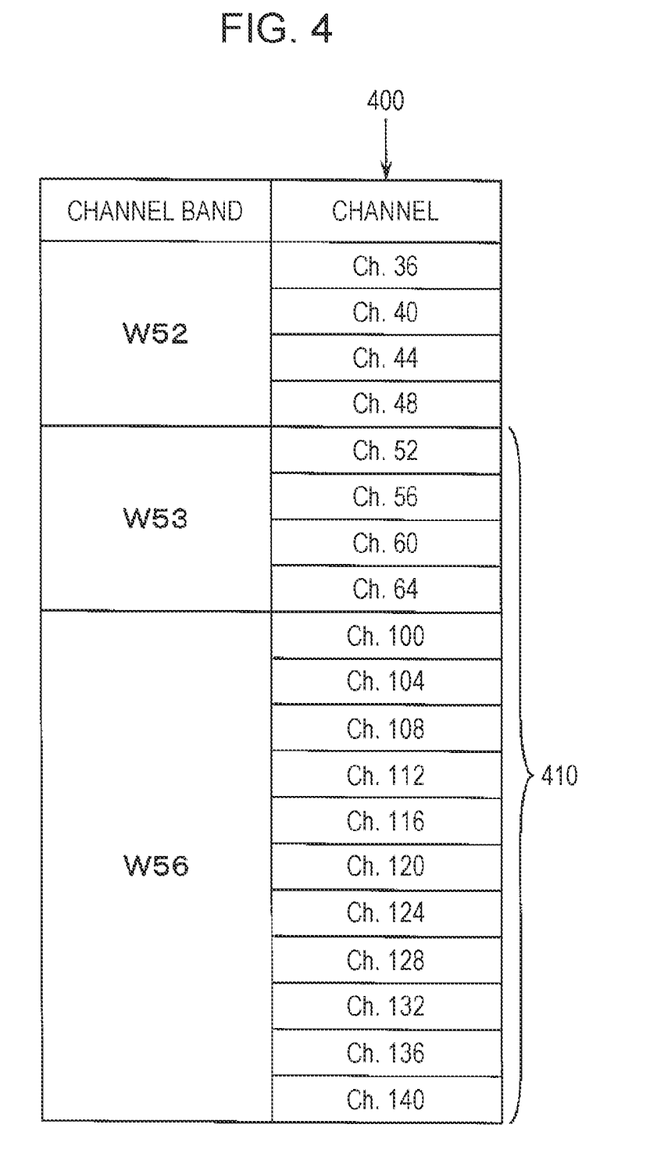
FIG. 4 is a table schematically illustrating an example of channels for wireless communication.

Next, wireless communication channels 400 included in the 5 GHz band will be described with reference to FIG. 4. The 5 GHz band includes three W52, W53, and W56 channel bands. The W52 channel band includes four non-DFS-enabled channels 36, 40, 44, and 48. The W53 channel band includes four DFS-enabled channels 52, 56, 60, and 64. The W56 channel band includes 11 DFS-enabled channels 100, 104, ..., 136, and 140. Also, 15 channels included in the W53 and W56 channel bands are target channels 410 to be changed upon detection of the interference radio wave 300.

3. Specific Example of Processing in Communication Control Unit

Figure 6:
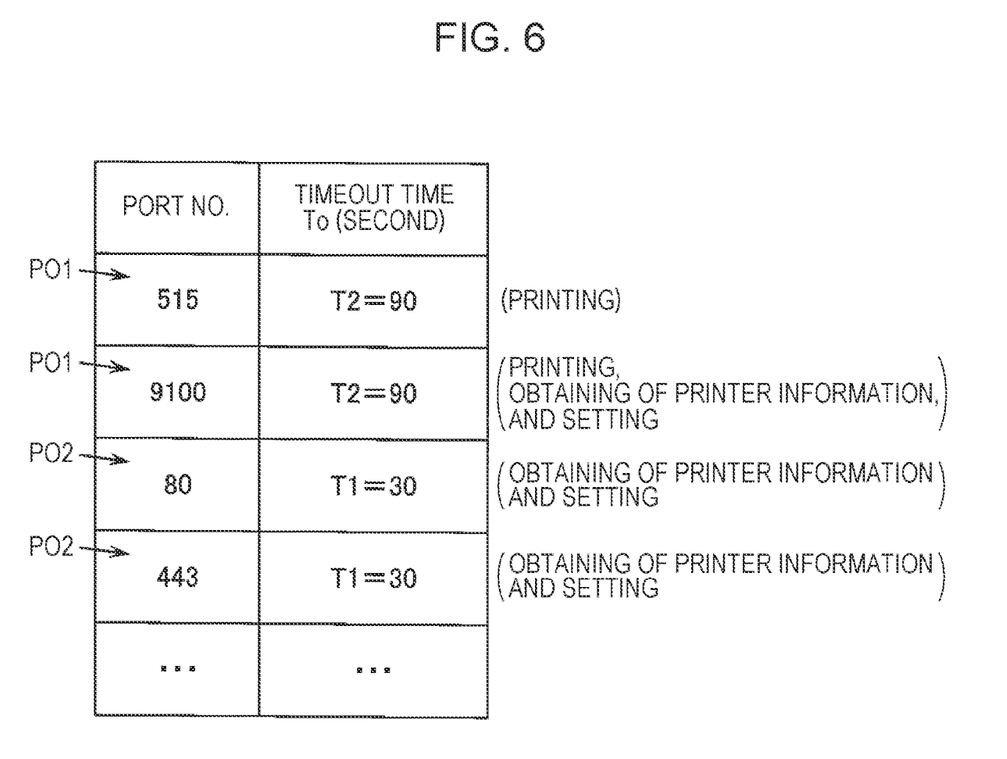
FIG. 6 is a table schematically illustrating an example of timeout times after changing.

FIG. 5 schematically illustrates timeout-time setting processing performed by the control unit 40 in the printer 1. The timeout-time setting processing corresponds to the communication control process ST2. FIG. 6 schematically illustrates the timeout times To after changing. When the communication unit 20 establishes wireless connection with the access point 100, the control unit 40 starts the timeout-time setting processing. First, in step S102, the control unit 40 obtains the number of a port and the number of a channel through which the wireless connection is established. Hereinafter, the term "step" is omitted, and the reference numeral of each step is shown in parentheses.

Next, based on the obtained port number, the control unit 40 determines whether or not the port through which the wireless connection is established is the first port PO1 used for printing, that is, for image processing (S104). For example, when the obtained port number is 515 or 9100, the control unit 40 may determine that the port through which the wireless connection is established is the first port PO1, and when the obtained port number is 80 or 443, the control unit 40 may determine that the port through which the wireless connection is established is not the first port PO1. When the port through which the wireless connection is established is the second port PO2 not used for printing, the control unit 40 advances the process to S110.

When the port through which the wireless connection is established is the first port PO1 used for printing, the control unit 40 determines whether or not the channel through which the wireless connection is established is the target channel 410 to be changed upon detecting the interference radio wave 300, based on the obtained channel number (S106). For example, when the obtained channel number is one of 52 to 140, the control unit 40 may determine that the channel through which the wireless connection is established is the target channel 410, and when the obtained channel number is not 52 to 140, the control unit 40 may determine that the channel through which the wireless connection is established is not the target channel 410. When the channel through which the wireless connection is established is not the target channel 410, the control unit 40 advances the process to S110.

When the channel through which the wireless connection is established is the target channel 410, the control unit 40 sets the timeout time To for the port through which the wireless connection is established to a second time T2 obtained by adding the monitoring time Tm, which is 60 seconds, to the default first time T1 (S108). That is, the second time T2 is given by T2=T1+Tm. Thus, when the first port PO1 used for printing is used, and the wireless connection is performed through the target channel 410 to be changed upon detection of the interference radio wave 300, the control unit 40 makes the timeout time To longer than the monitoring time Tm taken for monitoring the interference radio wave 300. After the process in S108, the control unit 40 ends the timeout-time setting processing.

When the port through which the wireless connection is established is the second port PO2 not used for printing, or when the channel through which the wireless connection is established is not the target channel 410, the control unit 40 maintains the default first time T1 as the timeout time To for the port through which the wireless connection is established (S110). After the process in S110, the control unit 40 ends the timeout-time setting processing.

For example, as illustrated in FIG. 3, port 515 for which the initial value of the timeout time To is the first time T1, which is 30 seconds, is used for printing. Accordingly, when the channel through which the wireless connection is established is the target channel 410, the timeout time To is set to the second time T2, which is 90 seconds longer than the monitoring time Tm, as illustrated in FIG. 6. The timeout time To for port 9100 used for printing is also set to the second time T2, that is, 90 seconds. Meanwhile, port 80 for which the initial value of the timeout time To is the first time T1, which is 30 seconds, is not used for printing, as illustrated in FIG. 3. Accordingly, even when the channel through which the wireless connection is established is the target channel 410, the initial first time T1, which is 30 seconds, is maintained as the timeout time To, as illustrated in FIG. 6. The first time T1, which is 30 seconds, is also maintained for port 443 not used for printing.

Meanwhile, when the timeout-time setting processing is not performed, and the access point performs switching to one channel included in the W53 and W56 channel bands, the wireless communication between the access point and the printer is stopped for at least the monitoring time Tm, which is 60 seconds. When the timeout time To passes while the wireless communication is stopped, a session with the host apparatus is disconnected, and the printing is not completed.

Figure 10:
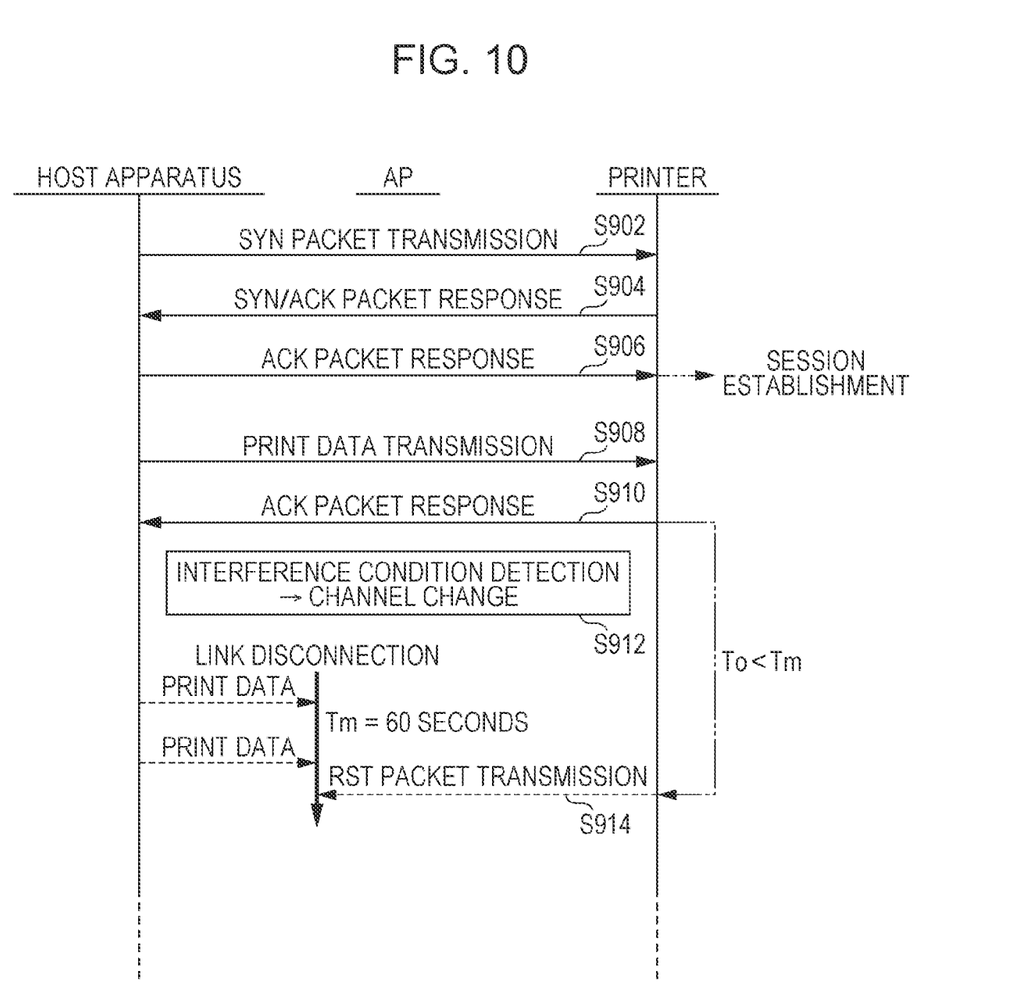
FIG. 10 is a diagram schematically illustrating a sequence in a wireless communication system according to a comparative example.

FIG. 10 schematically illustrates a sequence of a wireless communication system according to a comparative example. In this comparative example, an access point and a printer are assumed to use a channel in the W53 or W56 channel band that is DFS-enabled. Although the access point and a host apparatus may perform wireless communication using the DFS-enabled channel, they may also perform wireless communication using a channel in the W52 channel band or a channel in the 2.4 GHz band or may perform wired communication. For example, when one of the ports illustrated in FIG. 2 is used, the host apparatus issues a print instruction to the printer through TCP communication via the access point. TCP is an abbreviation for Transmission Control Protocol.

Specifically, first, the host apparatus transmits a SYN packet to the printer via the access point (S902). SYN is an abbreviation for synchronize, and the SYN packet is a packet transmitted from equipment at a transmission source to equipment at a transmission destination during establishment of a connection using TCP. In response to the SYN packet, the printer transmits a SYN/ACK packet to the host apparatus via the access point (S904). The SYN/ACK packet is also referred to as a "SYN/ACK packet response". ACK is an abbreviation for acknowledgement, and the SYN/ACK packet is a packet in which both a SYN flag and an ACK flag are set to 1. In response to the SYN/ACK packet, the host apparatus transmits an ACK packet to the printer via the access point (S906). The ACK packet is also referred to as an "ACK packet response". The ACK packet is a packet in which an ACK flag is set. In three-way handshake processing in S902 to S906, a session is established. At this point in time, wireless connection between the access point and the printer is established.

After the session establishment, the host apparatus starts transmitting a packet of print data to the printer via the access point (S908). In response to the packet of the print data, the printer transmits an ACK packet to the host apparatus via the access point (S910).

It is assumed that the access point detects an interference radio wave by using a DFS function in the middle of a process in which the host apparatus is transmitting the print data and starts processing for switching to another channel in the W53 and W56 channel bands (S912). Since the access point performs monitoring for the monitoring time Tm, that is, 60 seconds, to check whether an interference radio wave is detected on the channel to which the switching was performed, the link between the access point and the printer is disconnected for at least 60 seconds while TCP communication remains connected. When the timeout time To is, for example, 30 seconds that is shorter than the monitoring time Tm, the printer performs processing for transmitting a RST packet to the host apparatus via the access point when the timeout time To passes (S914). This is to allow a print instruction to be received from another host apparatus. RST is an abbreviation for reset, and the RST packet is a packet in which a RST flag is set to 1 in order to suspend or reject the TCP connection. Processing for transmitting the RST packet is processing for disconnecting the wireless connection. As a result of this processing, the wireless connection is disconnected, and thus printing is not completed.

Although not illustrated, there is also a possibility that after the host apparatus 200 transmits all print data, the link between the access point and the printer is disconnected before the wireless connection is successfully finished. In this case, after receiving all the print data, the printer performs processing for transmitting a FIN packet to the host apparatus via the access point. FIN is an abbreviation for finish, and the FIN packet is a packet in which a FIN flag is set to 1 in order to issue a notification indicating that the TCP connection is finished. When the host apparatus transmits a FIN packet to the printer via the access point in response to the FIN packet from the printer, the wireless connection is successfully finished. However, since the link between the access point and the printer has been disconnected, the host apparatus does not perform the FIN packet transmission processing, and thus the wireless connection is not finished. As a result, the printing may not be completed, and waiting for the timeout time To may occur until another host apparatus is enabled to use the printer.

The printer may be provided with a circuit for detecting interference radio waves in order to recognize a link disconnection during channel switching. Such a configuration, however, increases the cost of the printer.

FIG. 7 schematically illustrates a sequence in the wireless communication system SY1 in this specific example. The access point 100 and the printer 1 are assumed to use one target channel 410 in the W53 or W56 channel band that is DFS-enabled. Although the access point 100 and the host apparatus 200 may perform wireless communication using the target channel 410, they may perform wireless communication using the W52 channel band or the 2.4 GHz band channel or may perform wired communication. In FIG. 7, S202 to S206 correspond to the wireless communication process ST1 in which the wireless connection with the access point 100 is established. Also, S210 to S214 correspond to the communication control process ST2 in which the period before the control for disconnecting the wireless connection is performed is increased when the wireless connection is performed through the target channel 410 to be changed upon detection of the interference radio wave 300.

When the host apparatus 200 transmits a SYN packet to the printer 1 via the access point 100 (S202), the printer 1 transmits a SYN/ACK packet to the host apparatus 200 via the access point 100 in response to the SYN packet (S204). In response to the SYN/ACK packet, the host apparatus 200 transmits an ACK packet to the printer 1 via the access point 100 (S206). In the three-way handshake processing in S202 to S206, a session is established. At this point in time, wireless connection is established between the access point 100 and the printer 1.

After the session establishment, the host apparatus 200 starts transmitting a packet of print data to the printer 1 via the access point 100 (S208). In response to the packet of the print data, the printer 1 transmits an ACK packet to the host apparatus 200 via the access point 100 (S210).

It is assumed that the access point 100 detects the interference radio wave 300 by using the DFS function in the middle of a process in which the host apparatus 200 is transmitting the print data and starts processing for switching to another target channel 410 in the W53 and W56 channel bands (S212). Since the access point 100 performs monitoring for the monitoring time Tm, that is, 60 seconds, to check whether the interference radio wave 300 is detected on the target channel 410 to which the switching was performed, the link between the access point 100 and the printer 1 is disconnected for at least 60 seconds while TCP communication remains connected. In this specific example, since the timeout time To is changed from the initial first time T1, which is 30 seconds, to the second time T2, which is 90 seconds longer than the monitoring time Tm, which is 60 seconds, the printer 1 maintains the wireless connection until the link between the access point 100 and the printer 1 is restored. When the host apparatus 200 transmits a packet of subsequent part of the print data to the printer 1 via the access point 100 (S214), the printer 1 transmits an ACK packet to the host apparatus 200 via the access point 100 in response to the packet of the print data (S216). Thus, even when the link between the access point 100 and the printer 1 is disconnected for the monitoring time Tm upon detection of the interference radio wave 300, transmission/reception of the print data is continued, and printing is completed. Accordingly, the host apparatus 200 causes the printer 1 to execute printing without considering the link disconnection between the access point 100 and the printer 1, the link disconnection being caused by detection of the interference radio wave 300. From a user's perspective, a phenomenon in which printing is not successfully finished due to unintended link disconnection between the access point 100 and the printer 1 is suppressed.

As described above, when wireless connection is performed through the target channel 410 to be changed upon detection of the interference radio wave 300, the period before the wireless connection is disconnected becomes longer than the monitoring time Tm. Accordingly, this specific example makes it possible to reduce the possibility that the wireless connection is disconnected due to change of the channel 400, the change being performed when the access point 100 detects the interference radio wave 300.

4. Modifications

Various modifications are conceivable in the present disclosure. For example, a wireless communication apparatus to which the present technology can be applied may be an image processing apparatus other than a printer, a portable terminal, or the like. The image processing apparatus may also be an image forming apparatus other than a printer, an image reading apparatus for reading images, or the like. Examples of the image forming apparatus include not only a printing apparatus, such as an ink jet printer or a laser printer, but also a copying machine, a facsimile apparatus, multifunctional equipment having at least one of these functions, and a display device, such as a projector. Examples of the image reading apparatus include a scanner, a facsimile apparatus, multifunctional equipment having at least one of these functions, and an imaging apparatus, such as a camera.

The above-described processing is not only limited to the examples in which it is executed by the CPU, but may also be executed by another electronic component, such as an ASIC. ASIC is an abbreviation for application-specific integrated circuit. Naturally, the above-described processing may be performed by cooperation of a plurality of CPUs or may be performed by cooperation of one or more electronic components, such as a CPU and an ASIC. The communication control unit U2 in the printer 1 may be realized not only by the control unit 40 but also in the communication unit 20 or the like. Changes, such as interchanging the order, may be made to the above-described processes, as appropriate. For example, in the timeout-time setting processing illustrated in FIG. 5, the order of the determination process in S104 and the determination process in S106 can be interchanged.

The interference condition for an access point to change a channel for wireless connection is not limited to performing wireless connection through a target channel having a specific frequency for DFS and may be, for example, a congestion degree of radio waves of a target channel. For example, the relay apparatus may have an access point having an automatic channel selection function. The access point having the automatic channel selection function has a function for obtaining a congestion degree of radio waves of a channel through which wireless connection is established, and upon detecting that the obtained congestion degree exceeds a threshold, the access point switches the channel to a channel having a lower congestion degree. Since the link between the access point and the wireless communication apparatus is temporarily disconnected during the channel switching, the present technology can also be applied to cases in which an access point having the automatic channel selection function is used for a relay apparatus.

In the above-described embodiment, when the timeout time To is increased, the timeout time To is changed to the second time T2 obtained by adding the monitoring time Tm to the default first time T1. The present disclosure, however, is not limited to the example described above. Since it is sufficient that the second time T2 be longer than the monitoring time Tm, the timeout time To may be changed to the second time T2 that satisfies Tm<T2<T1+Tm. In the above-described embodiment, with respect to only the first port used for image processing, the timeout time To is increased when the wireless communication is performed through a target channel to be changed upon detection of the interference condition. The present disclosure, however, is not limited to the example described above. The present technology also encompasses increasing the timeout time To when wireless communication is performed through a target channel to be changed upon detection of the interference condition with respect to all ports.

The present technology can also be applied to cases in which a printer has a function for aggregating channels, which is called channel bonding. In this case, the timeout time To is set for a channel aggregation including a plurality of channels. When even one target channel to be changed upon detection of the interference condition is included in the channel aggregation through which wireless connection is established, the timeout time To set for the channel aggregation may be made longer than the monitoring time Tm in accordance with the timeout-time setting processing illustrated in FIG. 5.

Figure 8:
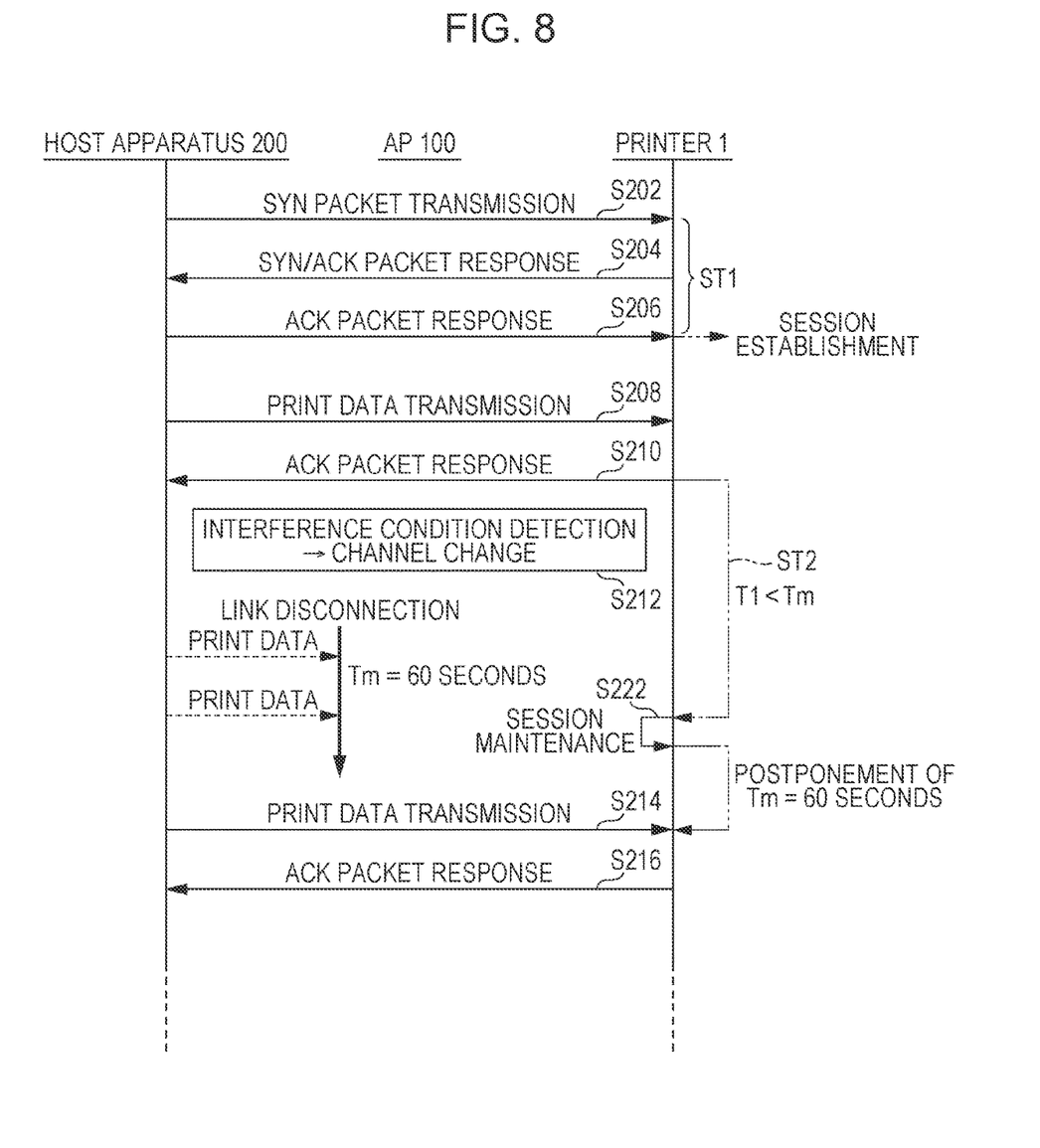
FIG. 8 is a diagram schematically illustrating a modification of the sequence in the wireless communication system.

As illustrated in FIG. 8, a method for increasing the period before the control for disconnecting the wireless connection is performed is not limited to changing the timeout time To. FIG. 8 schematically illustrates a sequence in the wireless communication system in which the wireless connection is maintained even when the link between the access point 100 and the printer 1 is disconnected upon detection of the interference condition while maintaining the initial timeout time To=T1. The sequence illustrated in FIG. 8 is a sequence obtained by adding a process in S222 to the sequence illustrated in FIGS. 7. S202 to S212, S214, and S216 in the sequence illustrated in FIG. 8 are substantially the same as S202 to S212, S214, and S216 in the sequence illustrated in FIG. 7.

When the access point 100 detects the interference radio wave 300 and starts processing for switching to another target channel 410 in the W53 and W56 channel bands (S212), the link between the access point 100 and the printer 1 is disconnected for the monitoring time Tm, that is, for 60 seconds. When the timeout time To passes while the link is disconnected, the printer 1 performs processing for further maintaining the session for the monitoring time Tm, that is, for 60 seconds (S222). This process means that when the transmission of the RST packet is delayed by the monitoring time Tm to cancel the link disconnection, the reception of the print data is continued. In the process in S222, the printer 1 maintains the wireless connection until the link disconnection between the access point 100 and the printer 1 is canceled. When the host apparatus 200 transmits a packet of subsequent part of the print data to the printer 1 via the access point 100 (S214), the printer 1 transmits an ACK packet to the host apparatus 200 via the access point 100 in response to the packet of the print data (S216). Thus, even when the link between the access point 100 and the printer 1 is disconnected for the monitoring time Tm upon detection of the interference radio wave 300, transmission/reception of the print data is continued, and the printing is completed.

Timeout-time setting processing considering the possibility that the initial timeout time To exceeds the monitoring time Tm may also be performed, as illustrated in FIG. 9. The timeout-time setting processing illustrated in FIG. 9 is processing obtained by adding a determination process in S302 to the timeout-time setting processing illustrated in FIG. 5.

Upon obtaining the number of a port and the number of a channel through which the wireless connection is established (S102), the control unit 40 determines whether or not the timeout time To is shorter than the monitoring time Tm (S302). The control unit 40 advances the process to S104 when the timeout time To is shorter than the monitoring time Tm and advances the process to S110 when the timeout time To is longer than or equal to the monitoring time Tm. For To<Tm, when the port through which the wireless connection is established is the first port PO1 used for printing, that is, for image processing, and the channel through which the wireless connection is established is the target channel 410 to be changed upon detection of the interference radio wave 300, the timeout time To is changed to the second time T2=T1+Tm (S108). For To≥Tm, the default first time T1 is maintained as the timeout time To for the port through which the wireless connection is established (S110). Accordingly, when the set timeout time To is shorter than the predetermined monitoring time Tm, and the wireless connection is performed through the target channel 410, the control unit 40 increases the period before the control for disconnecting the wireless connection is performed, and when the timeout time To is longer than or equal to the predetermined monitoring time Tm, the control unit 40 maintains the period based on the timeout time To.

Since the initial timeout time To is not changed when it is longer than or equal to the monitoring time Tm, as described above, this specific example makes it possible to suppress occurrence of an event in which a print request from another host apparatus is not accepted for a long time when the initial timeout time To is long.

5. Conclusion

As described above, the various aspects of the present disclosure can provide a technology for a wireless communication apparatus and so on that reduce the possibility that wireless connection is disconnected when the relay apparatus changes a channel. Naturally, the above-described basic effects and advantages can be obtained even with the technology including only constituent features according to the independent claims. In addition, it is possible to implement a configuration in which the constituent elements disclosed in the above-described examples are replaced with one another or the combination of the constituent elements is changed, a configuration in which the constituent elements disclosed in the related art and the above-described examples are replaced with one another or the combination of the constituent elements is changed, and so on. The present disclosure includes these configurations and so on.

What is claimed is:

1. A wireless communication apparatus that performs communication with a relay apparatus that performs change processing for changing a channel for wireless connection upon detecting an interference condition, the wireless communication apparatus comprising:
   a wireless communication unit that establishes the wireless connection with the relay apparatus; and
   a communication control unit that performs control for disconnecting the wireless connection, when the communication with the relay apparatus through the wireless connection stops for a period based on a set timeout time,
   wherein the communication control unit increases the period before the control for disconnecting the wireless connection is performed, when the wireless connection is performed through a target channel on which the change processing is performed.

2. The wireless communication apparatus according to claim 1,
   wherein the target channel has a specific frequency for dynamic frequency selection, and the interference condition is that the wireless connection is performed through the target channel; and
   when the wireless connection is performed through the target channel, the communication control unit makes the period before the control for disconnecting the wireless connection is performed longer than a monitoring time taken for the relay apparatus to monitor an interference radio wave.

3. The wireless communication apparatus according to claim 1,
   wherein the timeout time is set to a first time, and
   when the wireless connection is performed through the target channel, the communication control unit changes the timeout time to a second time that is longer than the first time.

4. The wireless communication apparatus according to claim 3,
   wherein, when the wireless connection is performed through the target channel, the communication control unit determines the second time by adding a predetermined time taken for dynamic frequency selection processing to the first time.

5. The wireless communication apparatus according to claim 1,
   wherein the wireless communication unit comprises a first port used for image processing and a second port not used for the image processing; and
   when the first port is used, and the wireless connection is performed through the target channel, the communication control unit increases the period before the control for disconnecting the wireless connection is performed, and when the second port is used, the communication control unit maintains the period based on the timeout time.

6. The wireless communication apparatus according to claim 1,
   wherein, when the set timeout time is shorter than a predetermined time, and the wireless connection is performed through the target channel, the communication control unit increases the period before the control for disconnecting the wireless connection is performed, and when the set timeout time is longer than or equal to the predetermined time, the communication control unit maintains the period based on the timeout time.

7. A wireless communication method that performs communication with a relay apparatus that performs change processing for changing a channel for wireless connection upon detecting an interference condition, the wireless communication method comprising:
   a wireless communication step of establishing the wireless connection with the relay apparatus; and
   a communication control step of performing control for disconnecting the wireless connection, when the communication with the relay apparatus through the wireless connection stops for a period based on a set timeout time, wherein, in the communication control step, the period before the control for disconnecting the wireless connection is performed is increased when the wireless connection is performed through a target channel on which the change processing is performed.

* * * * *